United States Patent

Ushida et al.

[11] Patent Number: 4,592,624
[45] Date of Patent: Jun. 3, 1986

[54] OBJECTIVE LENS FOR MICROSCOPE OF LOW MAGNIFICATION

[75] Inventors: Kazuo Ushida, Tokyo; Masashi Tanaka, Yokohama; Yoshiyuki Shimizu, Miura, all of Japan

[73] Assignee: Nippon Kogaku K.K., Tokyo, Japan

[21] Appl. No.: 670,928

[22] Filed: Nov. 13, 1984

[30] Foreign Application Priority Data

Nov. 22, 1983 [JP] Japan ................. 58-219799

[51] Int. Cl.$^4$ ...................... G02B 9/12; G02B 21/02
[52] U.S. Cl. .................................. 350/414; 350/478
[58] Field of Search ................. 350/478, 414

[56] References Cited

U.S. PATENT DOCUMENTS

3,428,390  2/1969  Rosenberger ............... 350/414
4,027,951  6/1977  Mori et al. .................. 370/414

Primary Examiner—John K. Corbin
Assistant Examiner—Scott J. Sugarman
Attorney, Agent, or Firm—Shapiro and Shapiro

[57] ABSTRACT

An objective lens for microscope of low magnification is of a two-group structure and is composed, in the order from the object side, of a converging front lens group having a meniscus lens component convex toward the object and a converging rear lens group including a positive lens component having a stronger curvature at the image side and a biconvex lens component. The meniscus lens component in the front lens group is composed of a biconvex positive lens and a biconcave negative lens adhered together at an adhered interface convex toward the image side. The lens surface at the object side of the meniscus lens component of the front lens group is convex toward the object side and has a positive refractive power, while the lens surface at the image side of said meniscus lens component is concave toward the image side and has a negative refractive power.

11 Claims, 6 Drawing Figures

OBJECTIVE LENS FOR MICROSCOPE OF LOW MAGNIFICATION

BACKGROUND OF THE INVENTION

1. Field of the Invention

The present invention relates to an objective lens for use in a microscope of a low magnification, and more particularly to such objective lens for use in a metallurgical microscope utilizing coaxial reflective illumination.

2. Description of the Prior Art

An objective lens for a microscope of low magnification is already disclosed for example in the U.S. Pat. No. 4,027,951 corresponding to the Japanese Patent Publication No. 52568/1982. Said objective lens is composed of three lens groups, of which a first lens group has a converging refractive power as a field lens for achieving a telecentric structure at the object side, namely with the entrance pupil at an infinite position, a second lens group has a diverging refractive power for focal length compensation and satisfactory correction of the Petzval sum, and a third lens group has a converging refractive power for realizing desired magnification and focal length in combination with the second lens group.

However, the above-described conventional structure with mutually separate first and second lens groups inevitably involves many air-to-lens interfaces and is practically unusable because of the low image contrast, since significant flare is generated in the coaxial reflective illumination method utilizing the objective lens itself for guiding the illuminating light.

SUMMARY OF THE INVENTION

The object of the present invention is to provide an objective lens for a microscope of low magnification, capable of reducing the flare and providing a high image contrast even in case of coaxial reflective illumination.

The foregoing object can be achieved according to the present invention by an objective lens, which is of a three-group structure the same as in the aforementioned conventional example but is different therefrom in that the air gap between the first and second lens groups is filled with glass to constitute, with these two lens groups, a meniscus lens component convex toward the object, thereby reducing the number of air-to-lens interfaces and minimizing the reflection of the illuminating light from the lens surfaces. More specifically, the objective lens for a microscope of low magnification according to the present invention is composed, in the order from the object side, of a converging front lens group (G1) having a meniscus lens component convex toward the object and a converging rear lens group (G2) including a positive lens component having a stronger curvature at the image side and a biconvex lens component, wherein the meniscus lens component in the front lens group (G1) is composed of a biconvex positive lens and a biconcave negative lens cemented together at a cemented interface (r2) convex toward the image side, and wherein the lens surface (r1) at the object side of said meniscus lens component in the front lens group is convex toward the object side and has a positive refractive power, while the lens surface (r3) at the image side of said meniscus lens component is concave toward the image side and has a negative refractive power.

The above-described basic structure of the present invention allows reduction of the flare caused by the lens surfaces, but the replacement of the first and second lens groups in the aforementioned conventional objective lens with a single meniscus lens component constituting the above-mentioned front lens group G1 brings about a new difficulty in that the converging effect on the light beam from the object is reduced by the presence of the glass filling between the converging field lens group and the diverging middle lens group, bringing the focal position of the front lens group unnecessarily backward. Stated differently, the aforementioned conventional threegroup objective lens, having the diaphragm practically in the rear group, is no longer telecentric at the object side. Therefore, in order to maintain the telecentric property (telecentricity) required for securing enough light in an objective lens of low magnification, it becomes necessary to increase the power of the lens surface at the object side of the meniscus lens component constituting the front lens group. Such increase, however, unfavorably affects the aberrations ranging from a middle part of the angle of view to a peripheral part thereof, particularly curvature of image plane and coma, thus giving rise to under-corrected aberrations.

Consequently, according to the present invention, the following conditions have to be met:

$$n1 < n2 \tag{1}$$

$$r1 > |r2| \tag{2}$$

$$r1 < D \tag{3}$$

wherein n1 and n2 are refractive indexes respectively of a biconvex lens and a biconcave lens constituting the meniscus lens component as the front lens group (G1), r1 and r2 are radii of curvature respectively of the lens surface at the object side of said meniscus lens component and the cemented lens surface convex to the image side of said meniscus lens component, and D is the axial thickness of said meniscus lens component.

More specifically, the biconvex lens and the biconcave lens defining the cemented lens surface in the meniscus lens component constituting the converging front lens group are given different refractive indexes as represented by the relation (1) to achieve a diverging effect in said cemented lens surface. Then, as represented by the relation (2), the absolute value of the radius of curvature r2 of the cemented lens surface has to be made smaller than the radius of curvature r1 of the first lens surface in order to correct the curvature of image plane and the coma aberration generated in said first lens surface, in consideration of two facts that the height of a ray from an object on the optical axis is smaller at the cemented lens surface (r2) in the meniscus lens component constituting the front lens group than at the first lens surface (r1) facing the object, and that the difference in refractive indexes across said cemented lens surface is smaller than that across said first lens surface facing air.

Also in order to maintain the telecentricity at the object side required for the objective lens of low magnification, the meniscus lens component constituting the front lens group should be so designed that the rear focal point thereof is positioned at the diaphragm of the entire system, namely at the rear lens group. For this purpose, as represented by the relation (3), the axial thickness D of the meniscus lens component constituting the front lens group should be selected larger than the radius of curvature r1 of the first lens surface. Besides, for achieving satisfactory correction of the Petzval sum in the basic structure of the present invention, the sum of the negative refractive powers of the diverging cemented lens surface (r2) in the front lens group and of the concave lens surface (r3) thereof has to be substantially equal to the sum of the positive refractive powers of the first lens surface (r1) and of the rear lens group (G2), and, for this reason, the refractive power of the first lens surface is smaller than the sum of the absolute values of the negative refractive powers of the adhered lens surface and of the concave lens surface at the image side. Consequently, the focal length of the front lens group becomes larger and eventually reaches a negative focal length as the axial thickness D of the meniscus lens component constituting the front lens group becomes smaller. This fact signifies a deficient refractive power in the front lens group and an inability to maintain the telecentricity indispensable for the objective lens of low magnification. Therefore, a condition:

$$d1 < n1 \cdot f1 \quad (4)$$

is desirable as complementary to the relation (3), wherein d1 is the axial thickness of the biconvex positive lens constituting the positive meniscus lens component, n1 is the refractive index thereof, and f1 is the focal length of the first lens surface represented by $$f1 = r1/(n1-1).$$

The positive lens in the meniscus lens component constituting the front lens group may naturally be provided with an additional cemented lens surface to increase the freedom of correcting aberrations.

The converging rear lens group (G2) is provided with two positive lens components for obtaining desired image magnification and image distance in the entire lens system, in combination with the negative refractive power of the front lens group. At least a component in the rear lens group has a cemented structure for satisfactorily correcting the spherical and chromatic aberrations. Also as will be explained in the following embodiment, it is also possible to bear a part of the diverging power of the concave lens surface at the image side of the meniscus lens component constituting the front lens group by the lens surface closest to the object side of the rear lens group.

DETAILED DESCRIPTION OF THE PREFERRED EMBODIMENTS

Figure 1:
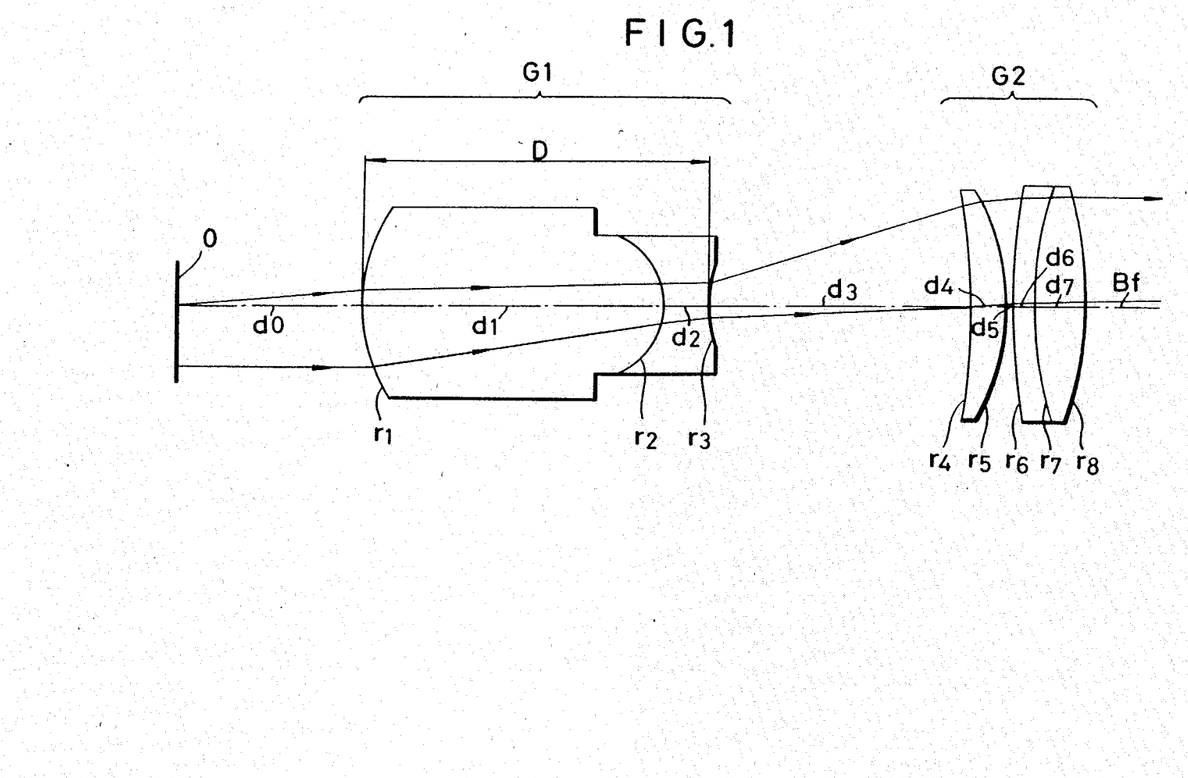
FIG. 1 is a schematic view of the lens structure of a first embodiment of the present invention.

Now the present invention will be clarified in detail by embodiments thereof. FIG. 1 shows the lens structure of a first embodiment of the present invention. Said first embodiment represents the most basic concept of the objective lens of the present invention, having an image magnification of 2.5 and N.A. of 0.075. As shown in FIG. 1, the lens is composed, in the order from the object side, of a first lens group (G1) of a meniscus lens component consisting of a biconvex lens and a biconcave lens which are mutually cemented, and of a rear lens group (G2) consisting of a positive meniscus lens convex to the image side with a lens surface of stronger curvature positioned toward the image side and a biconvex positive lens component composed of a negative meniscus lens and a biconvex positive lens which are mutually cemented.

The numerical data of the first embodiment are shown in the following table:

| [1st embodiment] f = 100 | | | | |
|---|---|---|---|---|
| No. | Radius of curvature r | Axial thickness/ distance d | Refractive index n | Abbe's number $\nu$ |
| | | d0 = 13.423 | | |
| 1 | 12.080 | 22.683 | 1.60342 | 38.1 | G1
| 2 | −5.235 | 2.953 | 1.90265 | 35.8 |
| 3 | 7.651 | 19.194 | | | G2
| 4 | −50.333 | 2.684 | 1.54739 | 53.6 |
| 5 | −14.764 | 0.067 | | |
| 6 | 122.141 | 1.342 | 1.75692 | 31.7 |
| 7 | 24.160 | 4.027 | 1.49782 | 82.3 |
| 8 | −27.667 | | | |
| | Bf = 262.846 | | | |

In the table, d0 indicates the distance from the object plane to the first lens surface, Bf indicates the distance from the last lens surface to the image plane, and the numerals in the left-end column indicate the order from the object side.

Figure 2:
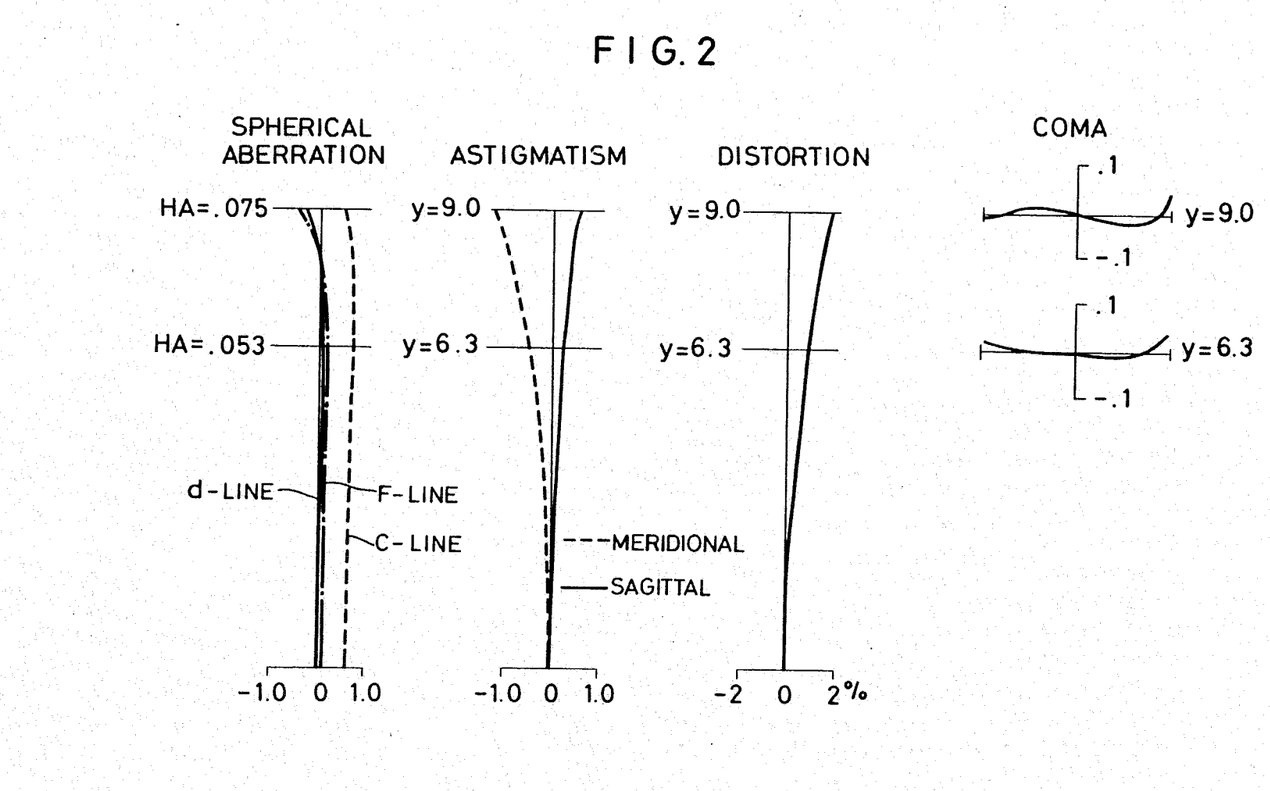
FIG. 2 is a chart showing the aberrations of said first embodiment.

FIG. 2 shows the aberrations of said first embodiment in case the entire length of the lens system from the object plane to the image plane is selected equal to 254 mm. FIG. 2 shows the spherical aberration, astigmatism, distortion and coma for the d line ($\lambda$=587.6 nm), and in the chart for spherical aberration, data are also shown for the C line ($\lambda$=656.3 nm) and the F line ($\lambda$=486.1 nm).

It will be understood, from the aberrations shown in FIG. 2, that the objective lens of the first embodiment has sufficient practical imaging performance despite its wide field of view represented by a magnification of 2.5.

Figure 3:
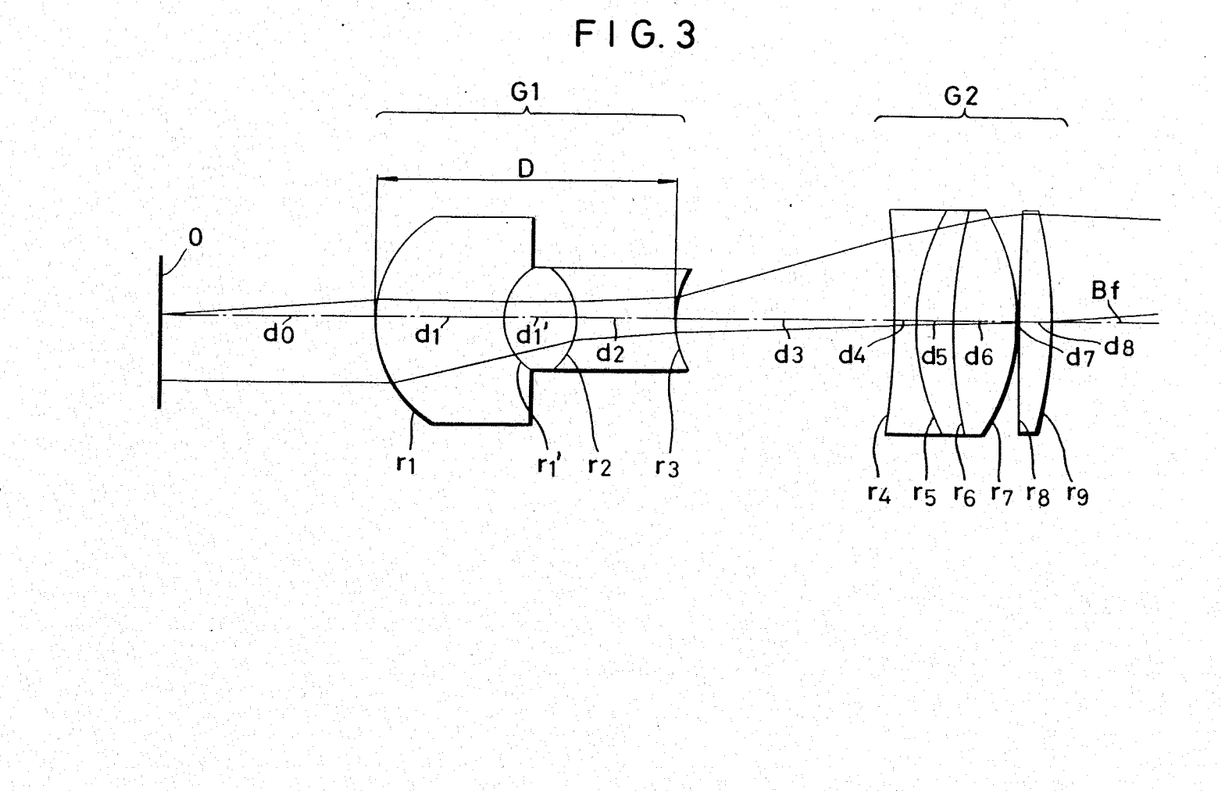
FIG. 3 is a schematic view of the lens structure of a second embodiment of the present invention.

A second embodiment of the present invention also has a magnification of 2.5 and N.A. of 0.075. As shown in FIG. 3, the biconvex positive lens in the front lens group (G1) is provided therein with a cemented lens surface (r1') convex to the object side. Consequently, the meniscus lens component constituting the front lens group is composed of a meniscus lens convex to the object side, a biconvex positive lens and a biconcave negative lens, which are mutually cemented together. Also the positive meniscus lens in the rear lens group (G2) is composed of a biconcave negative lens, a positive meniscus lens and a biconvex positive lens which are cemented together, and the positive lens at the image side is composed of a single positive lens.

Figure 5:
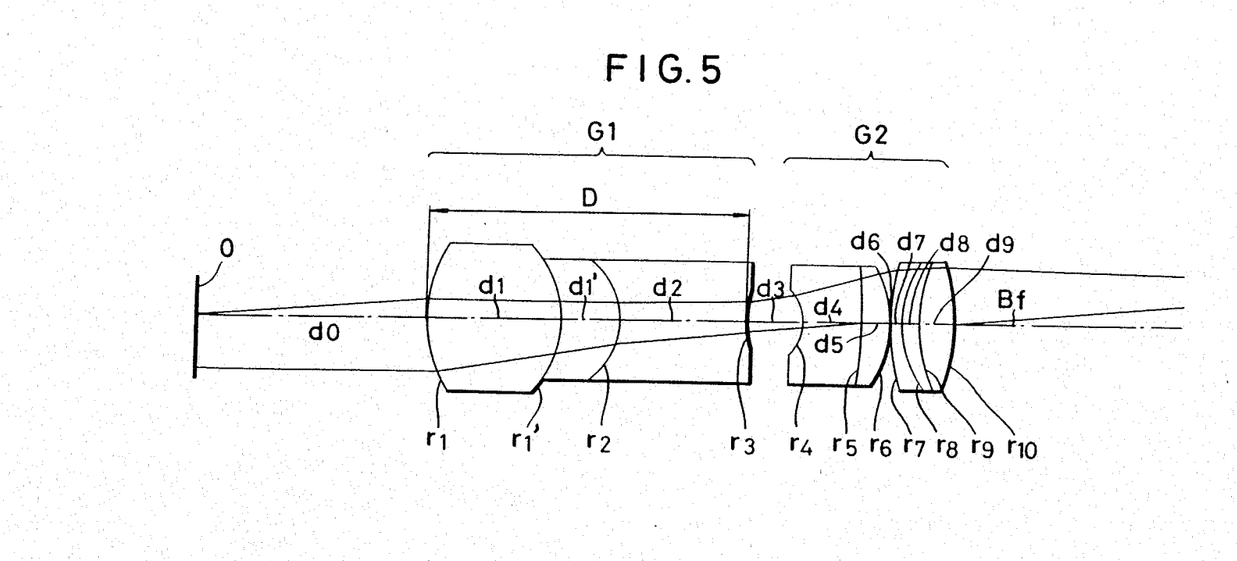
FIG. 5 is a schematic view of the lens structure of a third embodiment of the present invention.

A third embodiment also has a magnification of 2.5 and N.A. of 0.075. As shown in FIG. 5, the biconvex positive lens in the front lens group (G1) is provided therein with a cemented lens surface (r1') convex to the image side. Consequently, the meniscus lens component in the front lens group is composed of a biconvex positive lens, a meniscus lens convex to the image side and a biconcave negative lens which are mutually cemented together. Also the positive meniscus lens at the object side in the rear lens group (G2) is composed of a negative meniscus lens and a positive meniscus lens which are cemented together, and the positive lens at the image side is composed of a negative meniscus lens, a positive meniscus lens and a biconvex positive lens which are mutually cemented together.

The following tables show numerical data of said second and third embodiments in the same manner as in the first embodiment.

| | | [2nd embodiment] f = 100 | | | |
|---|---|---|---|---|---|
| No. | Radius of curvature r | Axial thickness/ distance d | Refractive index n | Abbe's number ν | |
| | | d0 = 15.356 | | | |
| 1 | 8.586 | 9.193 | 1.67025 | 57.6 | G1 |
| 1' | 4.089 | 5.216 | 1.54814 | 45.9 | |
| 2 | −4.089 | 7.107 | 1.86994 | 39.8 | |
| 3 | 8.188 | 15.714 | | | G2 |
| 4 | −58.284 | 1.304 | 1.75692 | 31.7 | |
| 5 | 16.627 | 2.804 | 1.80518 | 25.4 | |
| 6 | 40.145 | 4.564 | 1.49782 | 82.3 | |
| 7 | −13.752 | 0.065 | | | |
| 8 | 1049.405 | 2.347 | 1.49782 | 82.3 | |
| 9 | −31.030 | | | | |
| | | Bf = 256.543 | | | |

| | | [3rd embodiment] f = 100 | | | |
|---|---|---|---|---|---|
| No. | Radius of curvature r | Axial thickness/ distance d | Refractive index n | Abbe's number ν | |
| | | d0 = 31.431 | | | |
| 1 | 19.777 | 17.721 | 1.65844 | 50.8 | G1 |
| 1' | −14.770 | 7.897 | 1.51680 | 64.1 | |
| 2 | −9.644 | 17.721 | 1.87739 | 38.1 | |
| 3 | 24.079 | 7.127 | | | G2 |
| 4 | −7.518 | 8.026 | 1.52682 | 51.1 | |
| 5 | −79.744 | 3.981 | 1.69350 | 53.8 | |
| 6 | −17.092 | 0.064 | | | |
| 7 | 64.762 | 1.284 | 1.74950 | 35.2 | |
| 8 | 13.009 | 2.311 | 1.79504 | 28.6 | |
| 9 | 17.687 | 4.623 | 1.59319 | 67.9 | |
| 10 | −29.079 | | | | |
| | | Bf = 251.146 | | | |

Figure 4:
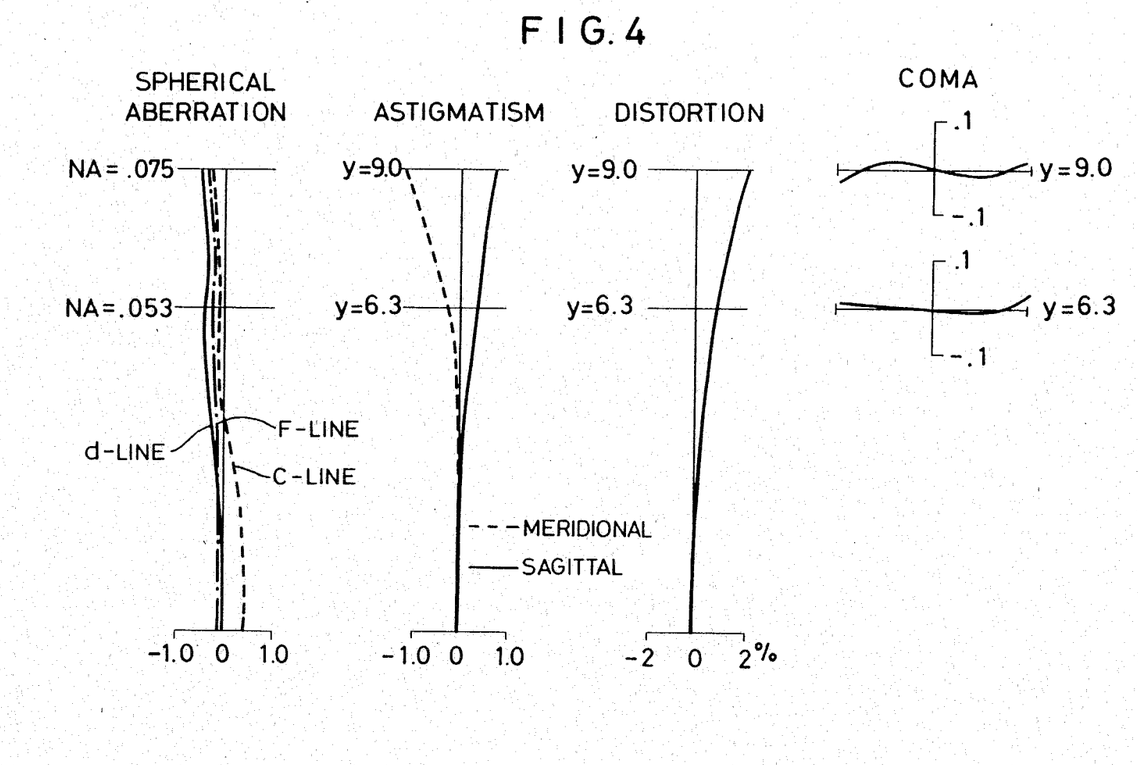
FIG. 4 is a chart showing the aberrations of said second embodiment.
Figure 6:
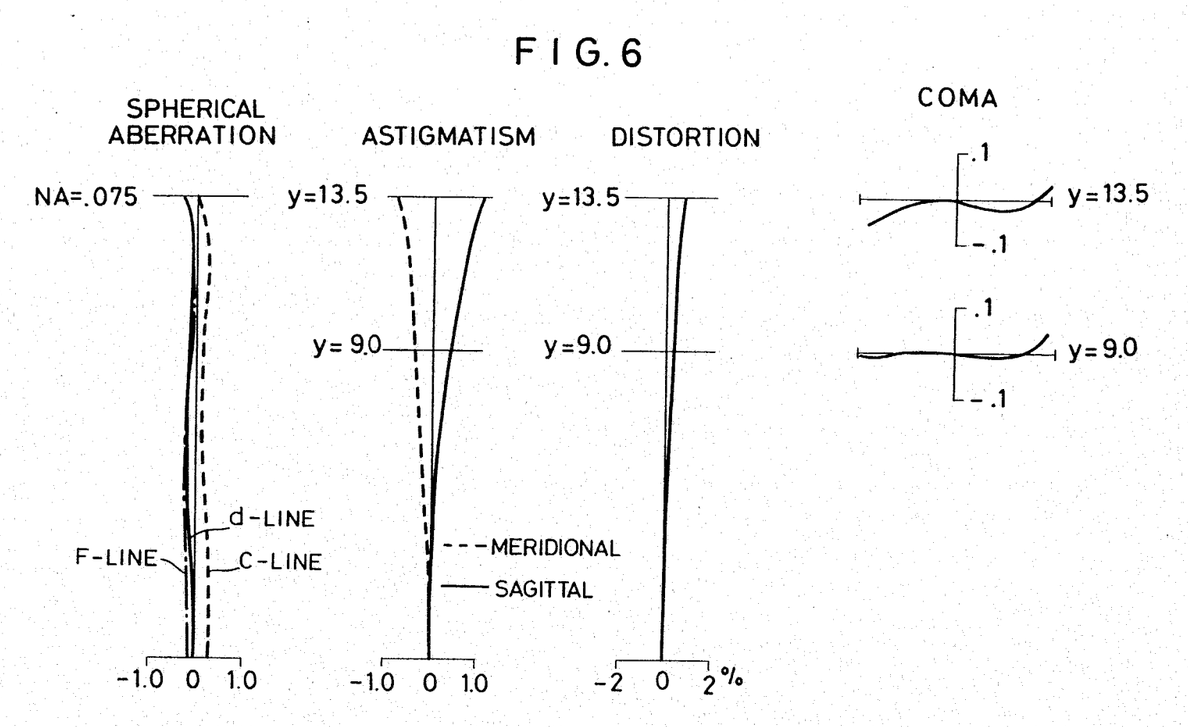
FIG. 6 is a chart showing the aberrations of said third embodiment.

FIG. 4 shows the aberrations of said second embodiment in case the entire length of the lens system is selected equal to 245 mm, and FIG. 6 shows the aberrations of said third embodiment in case the entire length of the lens system is selected equal to 275 mm.

It will be apparent from these aberration charts that the second and third embodiments exhibit excellent imaging performance despite their wide field of view represented by the magnification of 2.5.

As explained in the foregoing, the present invention provides an objective lens for a microscope of a low magnification, having reduced flare even in coaxial reflective illumination due to the reduced number of air-to-lens interfaces, while maintaining excellent imaging performance.

What is claimed is:

1. An objective lens for a microscope of low magnification, capable of reducing flare and providing a high image contrast even with coaxial reflective illumination, comprising, in the order from the object side:
   a converging front lens group including a meniscus lens component convex to the object side, said meniscus lens component being composed of a biconvex positive lens and a biconcave negative lens which are cemented together with a cemented lens surface convex to the image side, said cemented lens surface having divergent refractive power, and the convergent refractive power of the object side lens surface of said biconvex positive lens being smaller than the sum of the absolute values of the divergent refractive power of the cemented lens surface and the divergent refractive power of the image side lens surface of said biconcave negative lens; and
   a converging rear lens group including a positive lens component having a surface of stronger curvature positioned toward the image side and a biconvex positive lens component.

2. An objective lens according claim 1, satisfying conditions:

$n1 < n2$ $r1 < D$ wherein n1 and n2 are refractive indexes respectively of the biconvex lens and the biconcave lens constituting the meniscus lens component of said front lens group, r1 is a radius of curvature of the object side lens surface of said meniscus lens component and D is the axial thickness of said meniscus lens component.

3. An objective lens according to claim 2, further satisfying condition:

$|r1| > |r2|$ wherein r2 is a radius of curvature of the cemented lens surface convex to the image side.

4. An objective lens according to claim 3, satisfying the following condition:

$d1 < n1 \cdot f1$ \hfill (4)

wherein f1 is defined by $f1 = r1/(n1-1)$ and wherein d1 is the axial thickness of said biconvex positive lens, n1 is the refractive index thereof, and f1 is the focal length of the object side lens surface of said biconvex positive lens.

5. An objective lens according to claim 4, wherein the biconvex positive lens component in said rear lens group is composed of a negative meniscus lens and a biconvex positive lens which are mutually cemented, and the positive lens component with a lens surface of stronger curvature positioned toward the image side in said rear lens group has a meniscus shape convex to the image side.

6. An objective lens according to claim 5, having the following numerical data:

| | | f = 100 | | |
|---|---|---|---|---|
| No. | Radius of curvature r | Axial thickness/ distance d | Refractive index n | Abbe's number ν |
| | | d0 = 13.428 | | |

-continued

| | | f = 100 | | | |
|---|---|---|---|---|---|
| No. | Radius of curvature r | Axial thickness/ distance d | Refractive index n | Abbe's number ν | |
| 1 | 12.080 | 22.683 | 1.60342 | 38.1 | front |
| 2 | −5.235 | 2.953 | 1.90265 | 35.8 | lens |
| 3 | 7.651 | 19.194 | | | group |
| 4 | −50.333 | 2.684 | 1.54739 | 53.6 | rear |
| 5 | −14.764 | 0.067 | | | lens |
| 6 | 122.141 | 1.342 | 1.75692 | 31.7 | group |
| 7 | 24.160 | 4.027 | 1.49782 | 82.3 | |
| 8 | −27.667 | | | | |
| | | Bf = 262.846 | | | | wherein d0 is the distance from the object plane to the first lens surface, Bf is the distance from the last lens surface to the image plane and numerals in the left-end column are in the order from the object side.

7. An objective lens according to claim 4, wherein the biconvex positive lens in said front lens group is provided with a cemented lens surface convex to the object side, and the positive lens component with a lens surface with stronger curvature positioned toward the image side in said rear lens group has a meniscus shape convex to the image side and is composed of a biconcave negative lens, a positive meniscus lens and a biconvex positive lens which are cemented together.

8. An objective lens according to claim 7, having the following numerical data:

| | | f = 100 | | | |
|---|---|---|---|---|---|
| No. | Radius of curvature r | Axial thickness/ distance d | Refractive index n | Abbe's number ν | |
| | | d0 = 15.356 | | | |
| 1 | 8.586 | 9.193 | 1.67025 | 57.6 | front |
| 1' | 4.089 | 5.216 | 1.54814 | 45.9 | lens |
| 2 | −4.089 | 7.107 | 1.86994 | 39.8 | group |
| 3 | 8.188 | 15.714 | | | rear |
| 4 | −58.284 | 1.304 | 1.75692 | 31.7 | lens |
| 5 | 16.627 | 2.804 | 1.80518 | 25.4 | group |
| 6 | 40.145 | 4.564 | 1.49782 | 82.3 | |
| 7 | −13.752 | 0.065 | | | |
| 8 | 1049.405 | 2.347 | 1.49782 | 82.3 | |
| 9 | −31.030 | | | | |
| | | Bf = 256.543 | | | | wherein d0 is the distance from the object plane to the first lens surface, Bf is the distance from the last lens surface to the image plane and numerals in the left-end column are in the order from the object side.

9. An objective lens according to claim 4 wherein the biconvex lens in said front lens group is provided with a cemented lens surface convex to the image side, the positive lens component with a lens surface of stronger curvature positioned toward the image side in said rear lens group is provided with a cemented lens surface and has a meniscus shape convex to the image side, and the biconvex positive lens component in said rear lens group is composed of a negative meniscus lens, a positive meniscus lens and a biconvex positive lens which are cemented together.

10. An objective lens according to claim 9, having the following numerical data:

| | | f = 100 | | | |
|---|---|---|---|---|---|
| No. | Radius of curvature r | Axial thickness/ distance d | Refractive index n | Abbe's number ν | |
| | | d0 = 31.431 | | | |
| 1 | 19.777 | 17.721 | 1.65844 | 50.8 | front |
| 1' | −14.770 | 7.897 | 1.51680 | 64.1 | lens |
| 2 | −9.644 | 17.721 | 1.87739 | 38.1 | group |
| 3 | 24.079 | 7.127 | | | rear |
| 4 | −7.518 | 8.026 | 1.52682 | 51.1 | lens |
| 5 | −79.744 | 3.981 | 1.69350 | 53.8 | group |
| 6 | −17.092 | 0.064 | | | |
| 7 | 64.762 | 1.284 | 1.74950 | 35.2 | |
| 8 | 13.009 | 2.311 | 1.79504 | 28.6 | |
| 9 | 17.687 | 4.623 | 1.59319 | 67.9 | |
| 10 | −29.079 | | | | |
| | | Bf = 251.146 | | | | wherein d0 is the distance from the object plane to the first lens surface, Bf is the distance from the last lens surface to the image plane and numerals in the left-end column are in the order from the object side.

11. An objective lens for a microscope of low magnification, capable of reducing flare and providing a high image contrast even with coaxial reflective illumination, consisting essentially of, in the order from the object side:

a converging front lens group including a meniscus lens component convex to the object side, said meniscus lens component being composed of a biconvex positive lens and a biconcave negative lens which are cemented together with a cemented lens surface convex to the image side, said cemented lens surface having divergent refractive power, and the convergent refractive power of the object side lens surface of said biconvex positive lens being smaller than the sum of the absolute values of the divergent refractive power of the cemented lens surface and the divergent refractive power of the image side lens surface of said biconcave negative lens; and a converging rear lens group including a positive lens component having a surface of stronger curvature positioned toward the image side and a biconvex positive lens component, and wherein said objective lens satisfies the following conditions:

$n1 < n2$ $r1 < D$ where n1 and n2 are refractive indexes, respectively, of the biconvex lens and the biconcave lens constituting the meniscus lens component of said front lens group, r1 is a radius of curvature of the object side lens surface of said meniscus lens component, and D is the axial thickness of said meniscus lens component.

* * * * *